United States Patent [19]

Cogno

[11] Patent Number: 4,984,910
[45] Date of Patent: Jan. 15, 1991

[54] ADJUSTABLE SPACER, PARTICULARLY FOR ROLLING BEARINGS, AND SUPPORT ASSEMBLY IMPLEMENTING THE SAME

[75] Inventor: Pietro Cogno, Torino, Italy

[73] Assignee: RIV-SKF Officine Di Villar Perosa S.p.A., Italy

[21] Appl. No.: 407,124

[22] Filed: Sep. 14, 1989

[30] Foreign Application Priority Data

Sep. 16, 1988 [IT] Italy .................. 67828 A/88

[51] Int. Cl.$^5$ .................................. F16C 23/06
[52] U.S. Cl. .............................. 384/563; 384/583; 384/626
[58] Field of Search ........... 384/500, 504, 517, 519, 384/537, 540, 541, 563, 583, 626

[56]       References Cited
       U.S. PATENT DOCUMENTS

| 2,192,856 | 3/1940 | Nenninger | 384/563 X |
| 2,424,013 | 7/1947 | Bechler | 384/519 |
| 2,953,417 | 9/1960 | Horberg | 384/519 X |
| 4,433,879 | 2/1984 | Morris | 384/626 |
| 4,531,847 | 7/1985 | F'Geppert | 384/626 X |
| 4,657,412 | 4/1987 | McLarty et al. | 384/517 X |

FOREIGN PATENT DOCUMENTS

495218 4/1930 Fed. Rep. of Germany ...... 384/517

Primary Examiner—Thomas R. Hannon
Attorney, Agent, or Firm—Kinney & Lange

[57]       ABSTRACT

A spacer designed for fitment between pairs of oblique rolling bearings (taper roller, ball bearings or similar) for enabling adjustable axial positioning of the same inside a support assembly, e.g. the hub-axle assembly of a vehicle suspension, the outer element of which presents a through hole for enabling adjustment of the spacer; which spacer consists of a pair of coaxial annular elements, the first engaged partially in sliding manner inside the second; a third annular element mounted externally and in axially mobile manner on the first element and designed to act as a shoulder for the second element; and locking mechanism for selectively securing the third element in a number of predetermined axial positions on and integral with the first element.

9 Claims, 6 Drawing Sheets

ADJUSTABLE SPACER, PARTICULARLY FOR ROLLING BEARINGS, AND SUPPORT ASSEMBLY IMPLEMENTING THE SAME

BACKGROUND OF THE INVENTION

The present invention relates to an adjustable spacer, particularly for rolling bearings, and to a support assembly, particularly a vehicle hub-axle assembly, implementing the same.

On known vehicle wheel support assemblies, the hub, depending on the stress pattern involved, is fitted idly to the axle (connected to the vehicle suspension) by means of a pair of oblique rolling bearings, the inner rings of which are locked axially on to the innermost member of the assembly, in this case the axle. More generally speaking, on mechanical connections between rotary components, provision is usually made for support assemblies featuring a pair of rolling bearings locked axially in relation to one of two concentric, mutually rotating members. On known support assemblies of the aforementioned type, the rolling bearings are locked axially by inserting a rigid spacer and gripping the bearings between a fixed shoulder on one of said members, e.g. the axle, and a fastener, e.g. a nut, ring nut or retainer ring, fitted on to the axle itself. Particularly in the case of hub-axle assemblies, the use of rigid spacers of fixed predetermined axial length creates numerous assembly problems, due to the fact that, for the oblique bearings to operate correctly, these must be positioned axially to a high degree of precision for eliminating any clearance between the rings and rolling bodies of the same. On account of the machining tolerances involved, however, mutual axial positioning of the bearings cannot always be assured, despite accurate machining of the bearing ring surfaces contacting the spacer, and/or axial clearance may exist between the bearing components. At the assembly stage, therefore, the axial position of the support assembly bearings must be adjusted using calibrated shims, which means first assembling the rigid spacer, accurately measuring the clearance involved, dismantling the assembly, and reassembling it with the required calibrated shim.

SUMMARY OF THE INVENTION

The aim of the present invention is to provide an adjustable spacer designed to selectively assume different axial lengths; which may be adjusted externally without being removed off the assembly; and which involves only minor changes to the assembly as compared with known types.

With this aim in view, according to the present invention, there is provided an adjustable spacer, particularly for ensuring correct axial positioning of pairs of side-by-side rolling bearings on a support assembly, characterised by the fact that it comprises:

a first and second annular element mounted coaxially with each other, said first element being engaged partially and in sliding manner inside said second element;

a third element supported radially and in axially mobile manner on the outside of said first element, and designed to act as an axial shoulder for said second element; and locking means for selectively securing said third element in a number of predetermined axial positions on and angularly integral with said first element.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
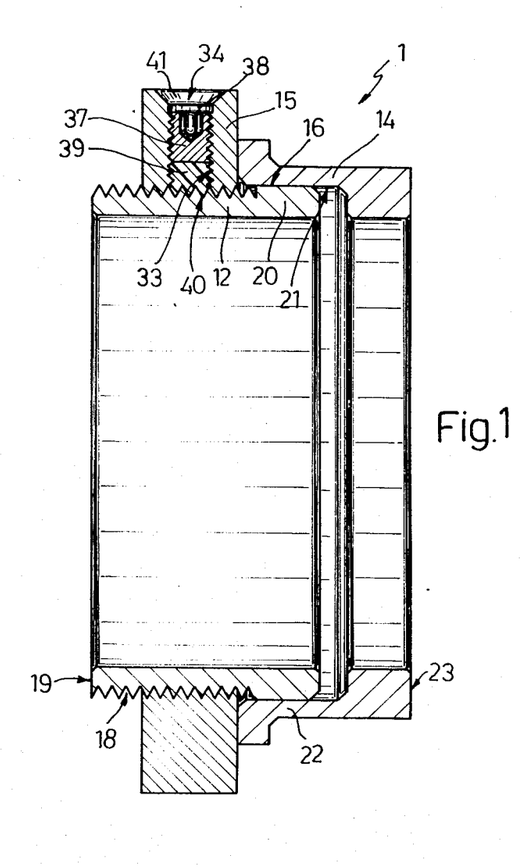
FIG. 1 shows a cross section of the spacer according to the present invention.
Figure 7:
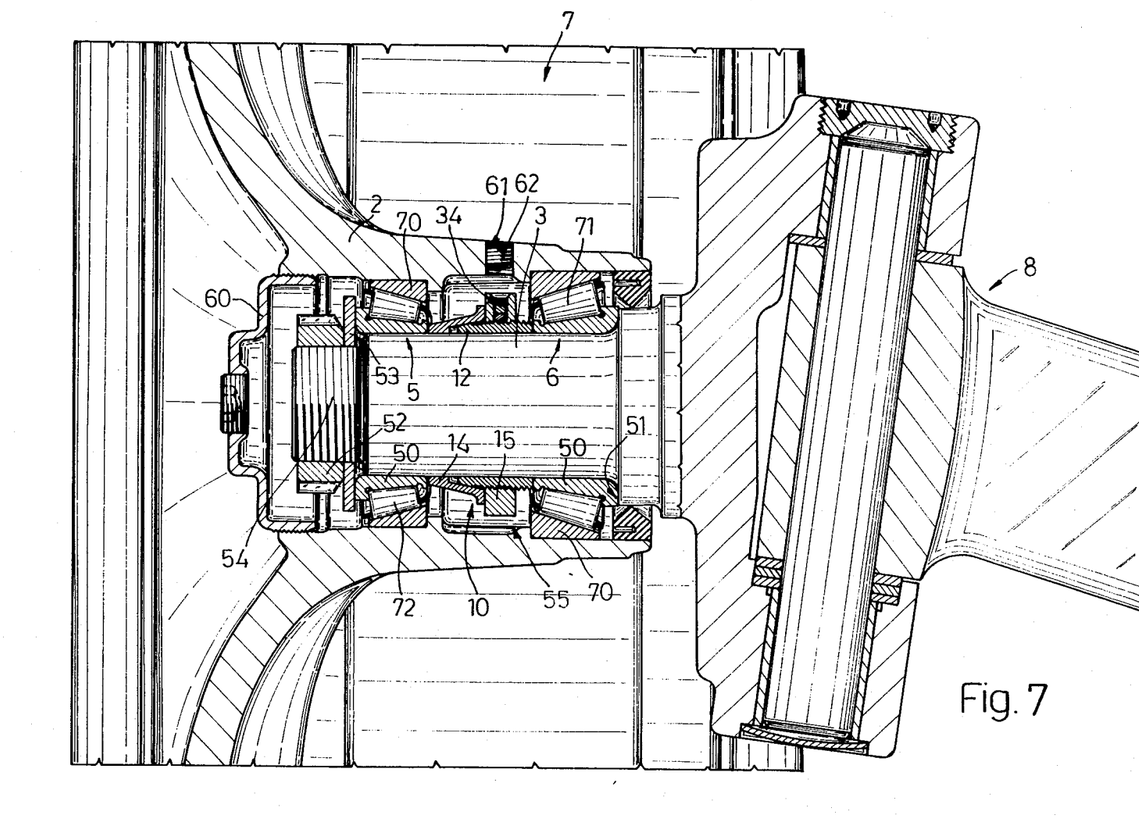
FIG. 7 shows a hub-axle assembly implementing the FIG. 2 spacer according to the present invention.

Number 1 in FIG. 1 and Number 10 in FIG. 7 indicates a spacer of adjustable length, designed for fitment on any mechanical support assembly featuring two concentric members 2 and 3 supported in mutually rotating manner on a pair of rolling bearings 5 and 6, for separating and ensuring predetermined axial positioning of the same. In the non-limiting example in FIG. 7, said mechanical assembly consists of a support assembly 7 for a known vehicle wheel (not shown) and comprising, in addition to said bearings 5 and 6, a hub 2 (shown only partially) for supporting said wheel, and an axle 3 supported on a known suspension 8 (shown only partially) of said vehicle (not shown). Said assembly 7 also comprises a spacer 10 (a larger-scale view of which is shown in FIG. 2) in accordance with the present invention and similar to spacer 1 in FIG. 1 of which it represents a preferred variation.

Figure 2:
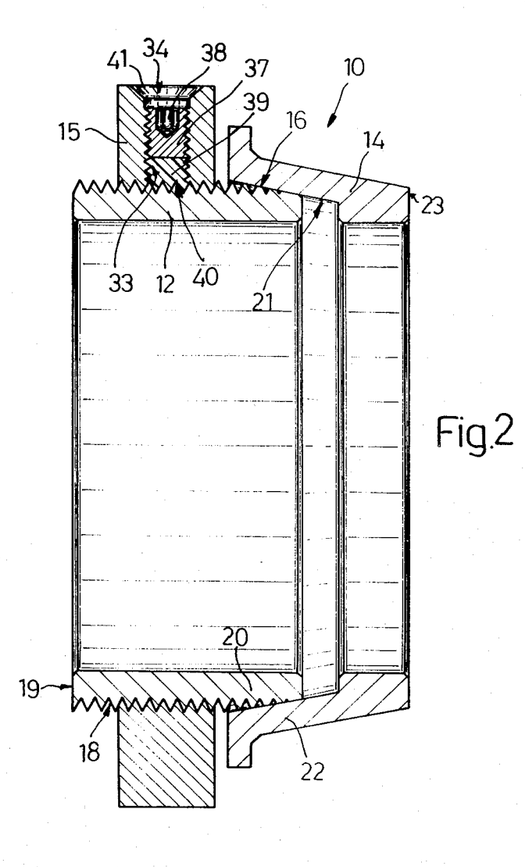
FIGS. 2 and 3 show similar cross sections of two variations of the spacer according to the present invention in two operating positions.

With reference to FIGS. 1 and 2, in which similar or identical details are indicated using the same numbering system, the spacer (1 or 10) according to the present invention comprises a first and second coaxial, sleeve-shaped, annular element 12 and 14 of different diameters, the first engaged partially in sliding manner inside the second; a third sleeve-shaped, annular element 15 defined, in the example shown, by a threaded ring nut supported externally and in axially sliding manner on element 12 and designed to act as an axial shoulder for element 14 which is partially fitted over element 12; and locking means for selectively securing element 15 in a number of predetermined axial positions along the axis of symmetry of and angularly integral with element 12.

In both the FIG. 1 and 2 examples, element 12, which is substantially cylindrical, is defined externally by a lateral surface 16 having a threaded portion 18 engaged by ring nut 15 and extending between a front end 19 and a preferably smooth portion for connection to element 14 and defined by end 20 opposite end 19. Said end 20 is tight fitted inside a seat 21 defined by a recess of suitable shape and size formed frontally on end 22 of element 14 opposite end 20. By virtue of recess 21, the radial thickness of said end 22 is less than that of the rest of element 14, in particular, that of opposite end 23.

In the FIG. 1 embodiment, end 20 and the recess defining seat 21 are both cylindrical, whereas, in the FIG. 2 embodiment, they are truncated-cone-shaped, tapering towards end 23 in the insertion direction of element 12 inside element 14. In both the embodiments shown, end 20 is tight fitted in sliding manner inside end 22, for example, by machining parts 20 and 21 of elements 12 and 14 to tolerances designed to produce a certain amount of interference between the same. For example, an h5/J6, h6/J7 or h6/K7 fit (ISO coding, shaft-basis system) or even slacker may be employed, so that axial force over and above a given threshold is required for axially sliding elements 12 and 14 in relation to each other, thus preventing inadvertent mutual sliding of elements 12 and 14 prior to assembly of spacer 1 (or 10) on to support assembly 7, while at the same time providing for stable connection of elements 12 and 14 and safe handling of spacer 1 or 10 with no danger of element 12 accidentally withdrawing from end 22 of element 14.

Figure 3:
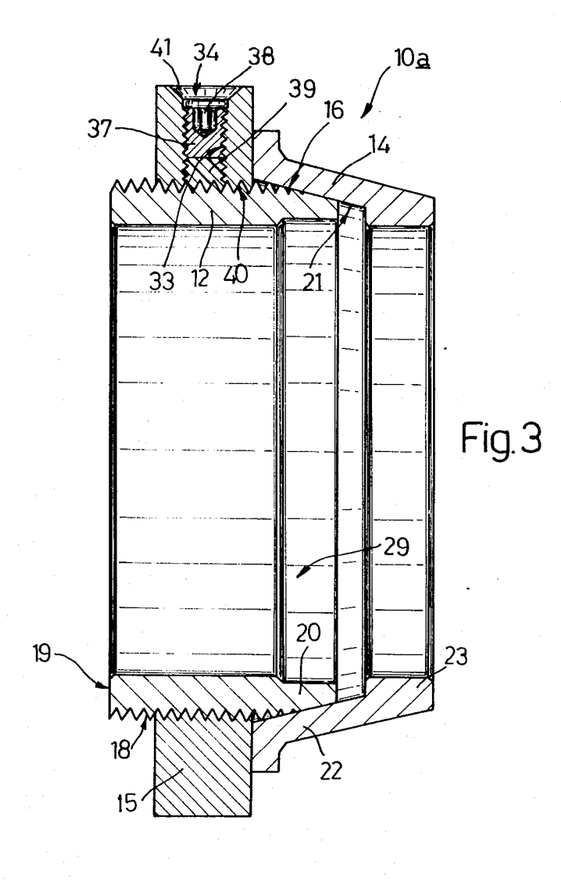
Figure 4:
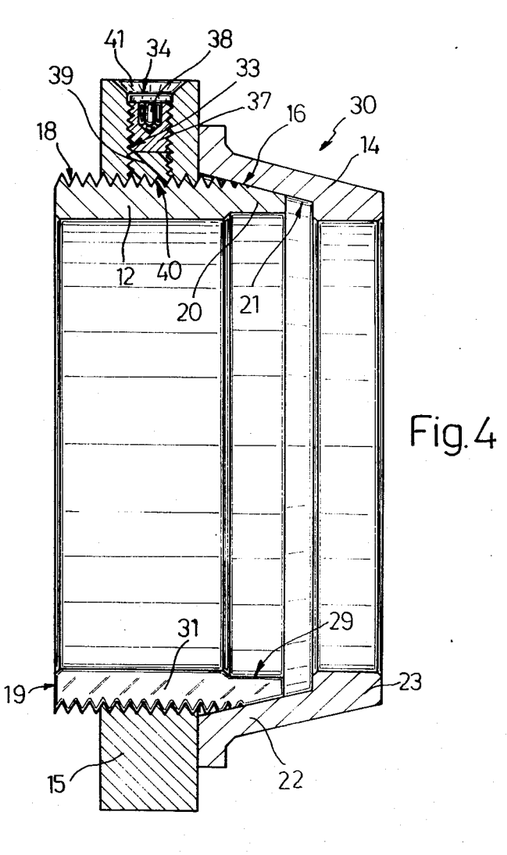
FIG. 4 shows a cross section of a third variation of the spacer according to the present invention.

As described in more detail later on, when adjusting the axial length of spacer 1 or 10 for setting elements 12 and 14 from the FIG. 5 to the FIG. 6 position wherein end 22 contacts element 15, element 12 is prevented from jamming inside element 14 by virtue of the smaller thickness of end 22 as compared with end 23, thus enabling end 22 to flex radially and so permit insertion of end 20 even if slightly off-center. A further two variations of the spacer according to the present invention are shown in FIGS 3 and 4, in which details similar or identical to those already described are indicated using the same numbering system. According to the FIG. 3 and 4 variations, for further assisting insertion of end 20 inside seat 21, the lateral wall of end 20 is also designed to flex radially. In particular, spacer 10a in FIG. 3 is identical to spacer 10 in FIG. 2, except for the presence of a recess 29 formed over the entire front length of end 20 for reducing the radial thickness of the lateral wall of the same. Number 30 in FIG. 4, on the other hand, indicates a spacer identical to that of FIG. 3, except that element 12, in addition to recess 29, also presents a longitudinal slot 31 formed radially along the generating line of lateral surface 16. Said slot 31 is designed to enable element 12 to flex (in the example shown, to shrink) circumferentially as it is inserted axially inside element 14, thus eliminating any danger of it jamming inside element 14 regardless of the elasticity of ends 22 and 20 provided for by reducing the thickness of the lateral walls of the same.

In all of variations 1, 10, 10a and 30 of the spacer according to the present invention, said means for axially and radially locking element or ring nut 15 on to element 12 are identical, and comprise a threaded radial hole 33 formed through element 15, and a laterally-threaded pawl 34 engaging hole 33. Said pawl 34 is preferably shorter than hole 33, and preferably consists of a gripping or control element 37 having, according to the non-limiting examples shown, a hexagonal socket head 38, and of a friction locking element 39 formed from soft deformable material, such as soft metal or synthetic plastic, and having a front end 0 designed to engage the crests of threaded portion 18 of element 12 with which ring nut 15 engages. For enabling trouble-free engagement of hexagonal socket head 8 by a known type of tool, the radially-outermost end of hole 33 preferably presents a flare 41.

Figure 5:
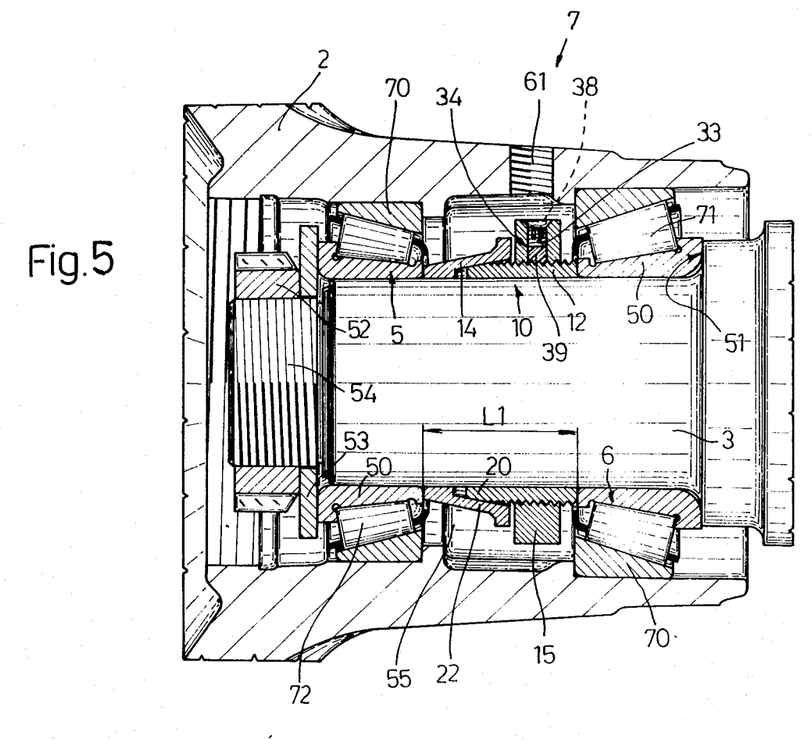
FIGS. 5 and 6 show stages in the assembly of the FIG. 2 spacer on to the hub-axle assembly of a known vehicle (not shown)
Figure 6:
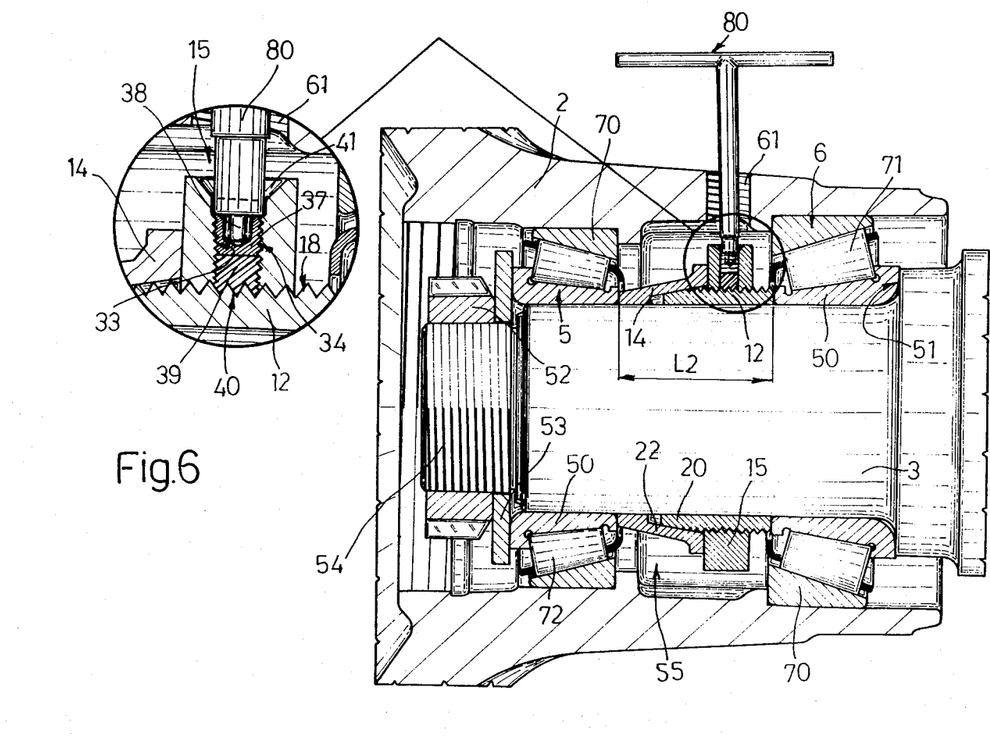

With reference to FIGS. 5, 6 and 7, assembly 7 is designed to accommodate any one of spacers 1, 10, 10a or 0 as described above. In the non-limiting example shown, assembly 7 is fitted with spacer 10, which is fitted on to axle 3, between respective inner rings 50 of bearings 5 and 6, which are in turn locked axially between a fixed shoulder 51 formed in one piece on axle 3 and a removable axial locking element consisting, in the example shown, of a ring nut 52 having a washer 53 and engaging a threaded portion 54 of axle 3. Axle 3, bearings 5 and 6, ring nut 52 and the spacer according to the present invention (spacer 10 in the example shown) are housed inside a cavity 55 on hub 2 closed on the ring nut 52 side by a cap 60 and, according to the present invention, accessible from the outside, at ring nut 15, via a radial hole 61 formed through the radially-outermost part of assembly 7, i.e. hub 2. In actual use, said hole 61 is sealed in fluidtight manner by a plug 62, e.g. threaded, and is designed to enable pawl 34 to be operated externally of assembly 7.

In actual use, the support assembly according to the present invention is assembled as follows. First of all, respective outer rings 70 of bearings 5 and 6 are fitted inside cavity 55. Inner ring 50 of bearing 6, complete with respective rolling bodies (in the example shown, taper rollers 71), is then fitted on to axle 3 against shoulder 51; axle 3 is fitted inside hub 2; the spacer according to the present invention (in the example shown, spacer 10), with elements 12 and 14 inserted one inside the other to produce a total spacer length Ll, is fitted on to axle 3; ring 50 of bearing 5, complete with respective rolling bodies (in the example shown, taper rollers 72), is fitted on to axle 3; after which, the whole assembly is tightened against shoulder 51 by torquing ring nut 52. This is done by the fitter operating manually on hub 2 from the outside, so as to rotate hub 2 in relation to axle 3 until a certain amount of resistance is encountered. This means that ring nut 52, on being torqued on to threaded portion 54, has forced ring 50 of bearing 6 against element 14, and element 14 together with bearing 6 against shoulder 51, thus further inserting end 20 inside seat 21, while at the same time forcing taper rollers 72 against outer ring 70 of bearing 5 and outer ring 70 of bearing 6 against taper rollers 71 of the same. As a result, any end clearance is removed, and the length Ll of spacer 10 reduced to a so-called "calibrated length" L2 at which any end clearance is eliminated or a slight preload present on bearings 5 and 6. Having thus positioned bearings 5 and 6 correctly in terms of operating load distribution, length L2 of the spacer is secured permanently, with no need for dismantling assembly 7, by simply operating as shown in FIG. 6 using a known type of tool 80 (which may consist of an ordinary screwdriver, should hexagonal socket head 38 be replaced by a screwdriver slot according to a further variation not shown). As shown in FIG. 6, hub 2 is turned so that pawl 34 corresponds with hole 61; tool 80 is inserted through hole 61 into hexagonal socket head 38; and, via tool 80, ring nut 15 is turned (together with hub 2) on to threaded portion 18, so as to bring end 22 into contact with ring nut 15 and so arrest rotation. At this point, spacer 10 is arranged as shown in Fig. 6 with length L2 equal to the required calibrated length, and at the correct axial distance between bearings 5 and 6, with no clearance between rings 50 and 70 and rolling bodies 71 and 72, and with element 14 locked axially in relation to element 12 by shoulder element 15. Said configuration is assured by axially and radially locking element 15 on to element 12 by turning pawl 34 inside hole 33 by means of tool 80, which causes soft locking element 39 to engage threaded portion 18 and so lock element 15. Once tool 80 is removed, cavity 55 may be filled with grease or other lubricating substances through hole 61, and sealed using cap 60 and plug 62, after first torquing ring nut 52 as recommended for the type of assembly 7 in question.

Figure 8:
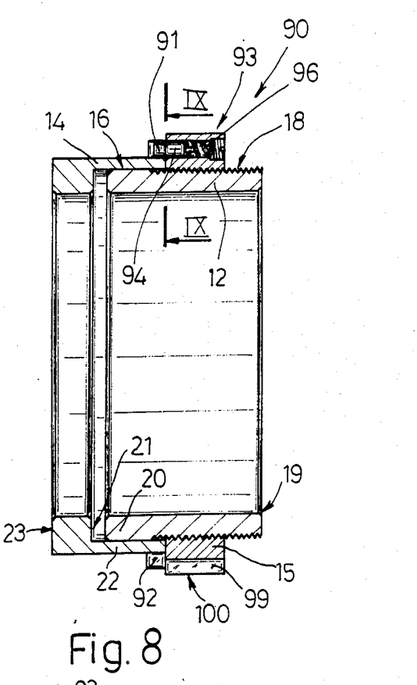
FIGS. 8, 9 and 10 show a cross section, a section along line IX—IX, and a larger-scale detail respectively of a fourth variation of the spacer according to the present invention.
Figure 9:
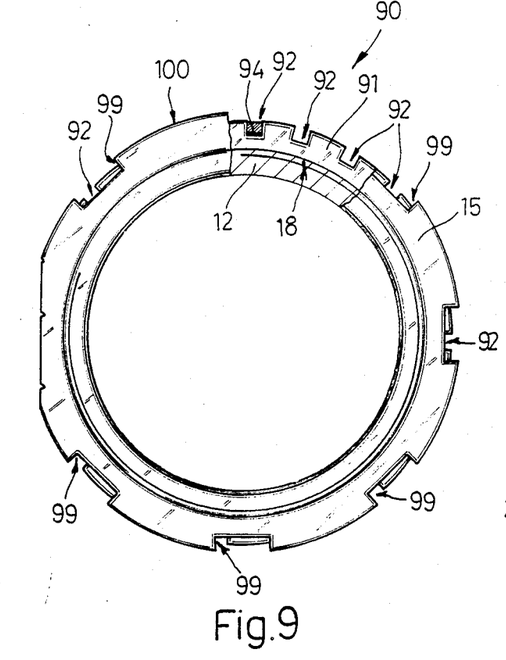
Figure 10:
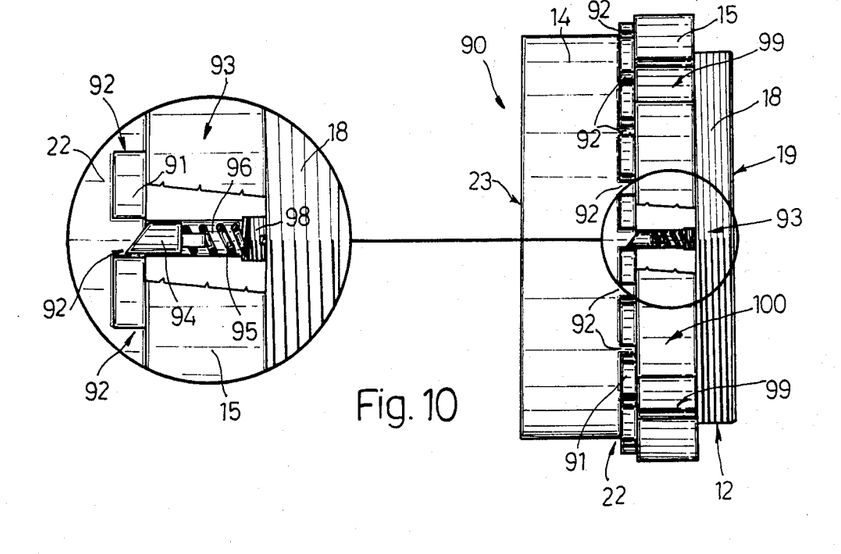

Number 90 in FIGS. 8 to 10 indicates a further variation of the spacer according to the present invention, any details similar or identical to those already described being indicated using the same numbering system. Spacer 90 is identical to spacer 1 already described, except that, instead of a radial pawl as in the foregoing embodiments, said means for locking element or ring nut 15 comprise a radial ring 91 formed externally integral and preferably in one piece with end 22, and having a number of equally-spaced circumferential recesses or slots 92; and a front pawl 93 set to a predetermined radial position by shoulder element 15 and projecting axially from the same towards end 22. Said pawl 93, which is designed to selectively engage recesses 92, may consist, for example, of a wedge-shaped peg 94 and a contrasting spring 95, both housed inside a seat 97 formed inside ring nut or element 15 and closed at the rear, on the opposite side to peg 94, by a plug 98. For enabling external rotation of assembly 7, ring nut or element 15 also presents grip portions for tool 80 consisting, for example, of slots 99 formed longitudinally on the cylindrical outer surface 100 of the same.

Spacer 90 operates in the same way as spacer 10 already described, and is perfectly interchangeable with the same on assembly 7. Having inserted element 12 inside element 14 to give the required calibrated length, tool 80 is inserted inside the first slot 99 facing hole 61, for torquing element 15 as already described. As element 15 moves towards end 22, pawl 93 withdraws against spring 95 as each slot 92 is passed, until, in the contact position, peg 94 engages the nearest slot 92 (FIG. 10), thus preventing reverse rotation of element 15, which is thus locked axially and angularly to element 12. The discreet arrangement of slots 92 in no way permits reforming of the clearance on bearings 5 and 6, by virtue of the calibrated position generally corresponding to a slight preload on the same. Consequently, even in the event of peg 94 being locked against ring 91 between two adjacent slots 92, and element 15 reversing when tool 80 is removed, element 15 is locked by peg 94 engaging the first slot 92 on ring 91, thus only slightly loosening element 14 which at most resets the bearings/spacer system to the zero preload, i.e. zero end clearance, condition.

I claim:

1. An adjustable spacer, for ensuring correct axial positioning of pairs of side-by-side rolling bearings on a support assembly comprising;
   a first and second annular element mounted coaxially with each other, said first annular element having a first end, the first end being engaged partially and in sliding manner inside a corresponding opposite first end on second annular element;
   a third element supported radially and in an axially mobile manner on the outside of said first annular element, and designed to act as an axial shoulder for said second annular element; and
   locking means for selectively securing said third element in a number of predeteremined axial positions on and angularly integral with said first annular element.

2. The spacer of claim 1 where the radial thickenss of said first end of the second element being less than that of the radial thickness of the rest of said second annular element.

3. The spacer of claim 2, wherein the first end of said first element is cylindrical, and engages inside a cylindrical seat defined by a recess formed inside said first end of said second element and is coaxially disposed within the second element.

4. The spacer of claim 2, wherein the first end of said first element is truncated-cone-shaped, and engages inside a truncated-cone seat defined by a recess formed inside said first end of said second element and is coaxially disposed within the second element.

5. The spacer of claim 1 wherein the first element presents a longitudinal slot formed along a generating line of a lateral surface of the first element; said slot configured to enable said first element to flex circumferentially as the first element is inserted axially inside said second element.

6. The spacer of claim 1 wherein the third element includes an annular ring nut engaging a threaded portion on the outer surface of said first element and extending up to said first end of the first element.

7. The spacer of claim 6 wherein the locking means includes a pawl engaging a threaded radial hole formed through said ring nut, and configured to engage said threaded portion; and a gripping element for controlling rotation of said pawl inside said threaded radial hole.

8. The spacer of claim 6 wherein the locking means includes a radial ring formed externally integral with said first end of said second element, and having a plurality of equally-spaced circumferential slots; and a front pawl set to a predetermined radial position by said third element, projecting axially from the third element towards said first end of said second element, and selectively engagable with said slots.

9. A support assembly including a hub-axle assembly of a vehicle suspension, comprising;
   first and second concentric mechanical members mounted for rotation in relation to each other via the interposition of at least a pair of rolling bearings fitted on to the first mechanical member locked axially between the fixed shoulder formed integral with said first mechanical member, and a removable axial locking element; and
   an adjustable spacer having an annular ring engaging a threaded portion on the outer surface of the first element and extending up to a first end of the first element, the adjustable spacer being located between said two rolling bearings; and at least a radial hole formed through the outermost of said first and second concentric mechanical members and designed to enable operation of said locking means from outside said support assembly.

* * * * *

UNITED STATES PATENT AND TRADEMARK OFFICE
CERTIFICATE OF CORRECTION

PATENT NO. : 4,984,910

DATED : January 15, 1991

INVENTOR(S) : Pietro Cogno

It is certified that error appears in the above-identified patent and that said Letters Patent is hereby corrected as shown below:

Col. 5, line 52, after "comprising", delete ";", insert --:--.

Col. 6, line 5, delete "where", insert --wherein--.

Signed and Sealed this

Twelfth Day of May, 1992

*Attest:*

DOUGLAS B. COMER

*Attesting Officer*      *Acting Commissioner of Patents and Trademarks*